C. B. MILLS.
SHORT CIRCUITING AND BRUSH LIFTING DEVICE FOR DYNAMO ELECTRIC MACHINES.
APPLICATION FILED APR. 9, 1918.
1,392,193.                                                      Patented Sept. 27, 1921.
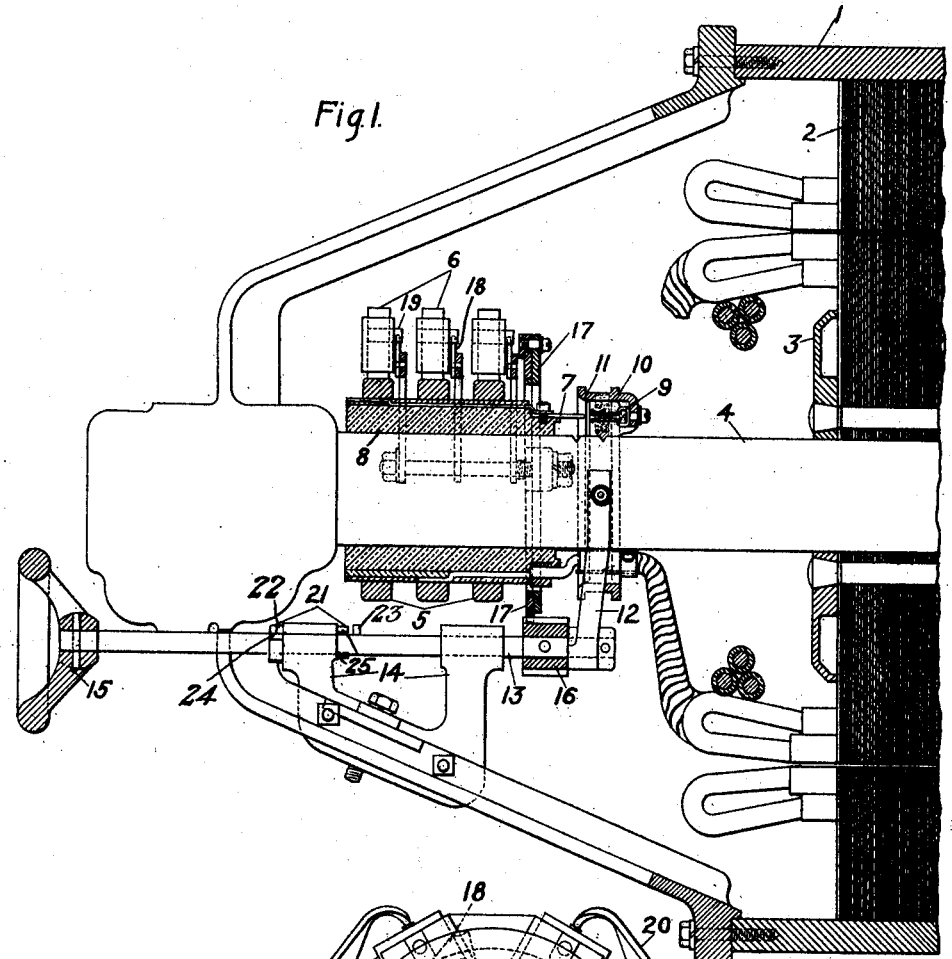
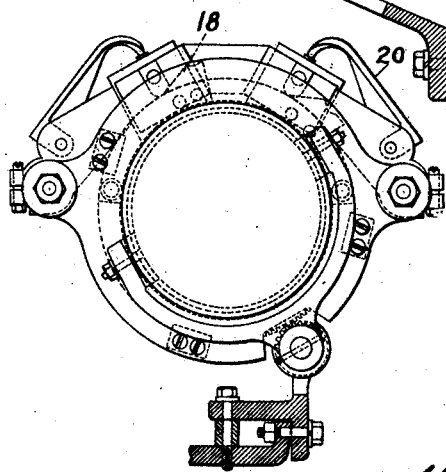
WITNESSES:
W. S. Reece
F. A. Lind.
INVENTOR
Chester B. Mills
BY
Wesley G. Carr
ATTORNEY

UNITED STATES PATENT OFFICE.

CHESTER B. MILLS, OF EAST McKEESPORT, PENNSYLVANIA, ASSIGNOR TO WESTINGHOUSE ELECTRIC AND MANUFACTURING COMPANY, A CORPORATION OF PENNSYLVANIA.

SHORT-CIRCUITING AND BRUSH-LIFTING DEVICE FOR DYNAMO-ELECTRIC MACHINES.

1,392,193.      Specification of Letters Patent.     Patented Sept. 27, 1921.

Application filed April 9, 1918. Serial No. 227,416.

*To all whom it may concern:*

Be it known that I, CHESTER B. MILLS, a citizen of the United States, and a resident of East McKeesport, in the county of Allegheny and State of Pennsylvania, have invented a new and useful Improvement in Short-Circuiting and Brush-Lifting Devices for Dynamo-Electric Machines, of which the following is a specification.

My invention relates to short-circuiting devices for dynamo-electric machines that are particularly adapted for use in connection with current-collecting rings of induction motors of the wound-rotor type.

The object of my invention is to produce a simple, compact and durable means whereby the collector rings may be short-circuited and the current-collecting devices raised by successive movements of a single handle.

Heretofore, it has been customary to accomplish the aforementioned results, either by means of a single device, which must necessarily be complicated and therefore expensive, or by means of two independent devices which, being separate, occupy much needed space within the machine casing and usually require a specially designed casing therefor.

By my invention, I provide a device which occupies a minimum amount of space and which may be mounted on a standard machine without any material modification of the casing.

Referring more particularly to the drawing, Figure 1 is a longitudinal sectional view of a portion of a dynamo-electric machine embodying my invention; and Fig. 2 is a transverse sectional view of the device illustrated in Fig. 1.

Referring more particularly to the drawing, I have shown a dynamo-electric machine 1 provided with a stator 2 and a rotor 3 which is mounted upon a shaft 4 and is electrically connected to collector rings 5 which are mounted upon an insulating supporting ring 8, which, in turn, is mounted upon the shaft 4. Current-collecting devices 6 bear upon each of the collector rings 5. Each of the collector rings 5 is provided with a contact member 7 which is electrically connected thereto and which projects from one end of the insulating supporting ring 8 upon which the collector rings are mounted. The contacts 7 are adapted to be short-circuited by contact clips 9 mounted upon a movable short-circuiting ring 10. The short-circuiting ring 10 is provided with a groove 11 on its external periphery within which a yoke member 12 is adapted to ride and by means of which the short-circuiting ring is moved into and out of engagement with the contact members 7. The yoke member 12 is mounted upon a shaft 13 which is provided with bearings 14 and is operated by means of a handle 15 which is located outside of the machine casing.

A gear wheel 16 is also mounted upon the shaft 13 and coöperates with an annular supporting member 17, upon which members 18, having cam-shape surfaces, are mounted to raise the brushes 6, as best shown in Fig. 2. When the supporting member 17 is subjected to rotative movement, the cam-shape faces of members 18 are moved into engagement with pins 19, which project from the current-collecting devices 6, to move them out of engagement with the collector rings 5. The members 18 are also provided, at their outer edges, with notches 20 within which the pins 19 rest during the time that the machine is operated with the brushes raised.

The shaft 13 is provided also with a locking device 21 mounted on one of the bearings 14 which prevents the shaft from being rotated to raise the brushes until the collector rings have been short-circuited. The locking device 21 comprises a pin 22 mounted on the shaft 13 on the open side of one of the bearings 14 and a pin 23 on the machine side thereof. The pins are spaced apart a distance greater than the width of the bearing. The bearing is provided with a narrow slot 24 in which the pin 22 rests when the collector rings are not short-circuited and in which position the shaft 13 cannot be rotated, thus preventing the brushes from being lifted when the collector rings are not short-circuited. The machine side of the bearing is provided with two circumferentially spaced pins 25 which coöperate with the pin 23, after the pin 22 has been moved out of the slot 24, to permit rotation of the shaft 13 in the proper direction and the proper angle only.

Having described the structure of my invention, the operation is as follows. When it is desired to start the machine, the handle 15 is moved into the position shown in the drawing, thereby disconnecting the short-circuiting ring 10 from the contacts 7 and also moving the brushes 6 into engagement with the collector rings 5. When the machine has attained a suitable speed, the handle 15 is moved longitudinally away from the machine, thereby moving the clips 9 of the short-circuiting ring 10 into engagement with the contact pins 7 which are circumferentially disposed upon the supporting ring 8. The handle 15 is then turned to cause the gear wheel 16 to rotate the member 17 upon which the members 18 are mounted, whereby the cam faces of the latter engage the pins 19 to lift the brushes from the collector rings. A further movement of the handle 15 rotates the ring 17 still farther to cause the pins 19 to engage the notches 20, where they remain during normal operation of the machine.

From the foregoing description, it will be readily apparent to those skilled in the art that the specified operations are performed by two independent and simple movements of the same handle and that there is no possibility of making any mistake in starting the machine, since the locking device prevents any movement of the handle 15 other than the correct one.

While I have shown a preferred form of my invention, it will be obvious to those skilled in the art that it is not so limited but is susceptible of various minor changes and modifications within the scope of the appended claims.

I claim as my invention:

1. In a dynamo-electric machine, the combination with a plurality of collector rings, and current-collecting devices in engagement therewith, each of said devices being provided with a projection, of a semi-annular ring member provided with a cam-shape surface mounted adjacent each of said devices so as to engage said projection, all of said ring members being connected into a unitary structure, and means for rotating said structure.

2. In a dynamo-electric machine, the combination with a plurality of collector rings, and current-collecting devices in engagement therewith, each of said devices being provided with a projection, of a semi-annular ring member provided with a cam-shape surface mounted adjacent such of said devices so as to engage said projection, said cam-shape surface being provided with a notch at the highest point thereof for the reception of said projection, all of said ring members being connected into a unitary structure and mounted upon an annular gear, and a hand-operated gear meshing with said aforementioned gear.

3. In a dynamo-electric machine, the combination with a plurality of collector rings and current-collecting devices in engagement therewith, each of said current-collecting devices being provided with a supporting structure, of a device for moving said brushes out of engagement with said collector rings which comprises a plurality of semi-annular ring members each provided with a cam-shape surface for engaging the supporting structure of one of said current-collecting devices, said members being mounted on a supporting member which is adapted for rotative movement.

4. In a dynamo-electric machine, the combination with a plurality of collector rings and current-collecting devices in engagement therewith, each of said devices being provided with a projection, of a ring member adapted to short circuit said collector rings when subjected to longitudinal movement, and a shaft provided with an arm which is adapted to coact with said short-circuiting ring to move said ring in a longitudinal direction, and a device for moving said current-collecting devices out of engagement with said collector rings comprising members mounted on an annular supporting member and provided with cam-shape surfaces which are adapted to engage the said projection on the said current-collecting devices when said supporting member is subjected to rotative movement, and with a gear wheel mounted on said shaft and adapted to coact with said annular supporting member to produce a rotative movement thereof.

In testimony whereof, I have hereunto subscribed my name this 30th day of March, 1918.

CHESTER B. MILLS.

It is hereby certified that in Letters Patent No. 1,392,193, granted September 27, 1921, upon the application of Chester B. Mills, of East McKeesport, Pennsylvania, for an improvement in "Short-Circuiting and Brush-Lifting Devices for Dynamo-Electric Machines," an error appears in the printed specification requiring correction as follows: Page 2, line 54, claim 2, for the word "such" read *each;* and that the said Letters Patent should be read with this correction therein that the same may conform to the record of the case in the Patent Office.

Signed and sealed this 29th day of November, A. D., 1921.

[SEAL.] KARL FENNING,

*Acting Commissioner of Patents.*